United States Patent Office 2,895,928
Patented July 21, 1959

2,895,928

RESIN-BLOOD GLUE AND PROCESS OF MAKING THE SAME

Charles N. Cone, Portland, Oreg., assignor, by mesne assignments, to American-Marietta Company, Chicago, Ill., a corporation of Illinois No Drawing. Application October 13, 1954
Serial No. 461,947

23 Claims. (Cl. 260—7)

This invention relates to a blood glue base and to a blood glue made therefrom and to processes of making the blood glue base and the blood glue. Although the presently described blood glue is useful in many applications, it is particularly applicable as a glue for uniting wood veneers in the manufacture of plywood.

This application is a continuation-in-part of my copending application, Serial No. 154,717, filed April 7, 1950.

As is well known, there are two grades of blood which are available commercially for use as raw materials in the manufacture of glues. The one, dried soluble blood (soluble dried blood) is prepared by drying fresh blood without coagulating it. As the name implies, it is soluble, or at least dispersible, in aqueous media. The other, insoluble or coagulated and dried blood (fertilizer blood), is prepared by heating or otherwise treating fresh blood to coagulate it, after which it is dried and ground. This product is not soluble in water and ordinarily is used for feed or fertilizer.

In my United States Patent 1,976,436, there is disclosed a blood glue comprising soluble dried blood mixed at normal temperatures with caustic alkali, hydrated lime, and sodium silicate. While this glue is useful for some purposes, it is subject to a pronounced tendency to become too viscous for use and to gel when used in conventional glue spreading apparatus. As a result, it has never been used commercially except in admixture with at least an equal amount of other adhesive materials such as soybean flour and casein, which to some extent mask or control its undesirable viscosity and spreading properties.

In my United States Patent 2,400,541, a glue is described which is made from fertilizer grade, insoluble, coagulated and dried blood, the primary purpose of the invention being to convert this abundant, relatively inert, dried product to a useable glue. The process employed consists of heating the blood in aqueous alkaline medium at a temperature of preferably between 180° F. and the boiling point of the medium. This hydrolizes or otherwise acts upon the blood and causes it to swell, soften, and disperse until it becomes a relatively homogeneous, viscous mass. The hydrolyzed blood then is cooled to approximately room temperature after which conditioning agents including additional alkali, lime and sodium silicate are added to form the final glue mixture.

The above glue also is useful in some applications, but its preparation is attended by the serious difficulty that the mixture resulting from cooking the blood with alkali rapidly gels and becomes thick upon cooling. As a result, it is impossible to secure effective heat transfer between the cooling medium and the glue mixture. This, in turn, extends to many hours the period of time required to bring the mixture down to room temperature, which has apparent disadvantages in loss of time and the necessity of using elaborate cooling equipment.

I now have discovered a process for preparing a blood glue which overcomes the foregoing and other difficulties encountered in the preparation and use of the prior art blood glues. The novel glue base and glue which are the products of my new process are made from soluble dried blood, fresh (whole or defibrinated) blood and mixtures thereof. The novel glues of my invention have superior spreading properties over a wide viscosity range and are of fine consistency and not curdy. Hence, they are well suited for application with conventional glue spreaders, employing low spread values. In addition, my new glues do not dry out rapidly or penetrate excessively into the wood surfaces to which they are applied, and therefore have a long assembly time. Having no tendency to gel upon standing, their time-viscosity characteristics are excellent. Still further, they are especially well suited for use in conjunction with the phenol-aldehyde and other thermo-setting resins, and they form an improved bond of high water resistance. These results are surprising in view of the fact that the blood constituent of the glue is in the form of a finely divided, fresh, undried coagulum, whereas heretofore it has been considered necessary to utilize uncoagulated blood or insoluble, coagulated and dried blood in the form, respectively, of a solution or dispersion. The fact thus is emphasized that there is a peculiar virtue in the manufacture of blood glues in using a finely divided, fresh, undried blood coagulum in the making of a glue.

Generally stated, the presently described process for the preparation of blood glues comprises first forming a uniform, stable, aqueous dispersion of finely divided, undried, coagulated blood particles. This is the glue base of my invention. Although this may be made by grinding coarse lumps of freshly coagulated, undried blood, as by passing them through a colloid mill in aqueous suspension, a superior product is obtained by dissolving in water the dried soluble blood of commerce (and/or liquid, undried blood if desired), and then coagulating it while subjecting it to vigorous agitation or other conditions calculated to form a fine dispersion of coagulated blood particles in the aqueous medium. The coagulation may be effected in any desired manner, say through the agency of heat, at temperatures above about 120° F., of added chemicals, or both. If it has been brought about by the application of heat, the blood coagulum aqueous dispersion is cooled to a temperature of less than about 120° F., preferably to about room temperature, this being accomplished rapidly and easily in a matter of but a few minutes since the coagulum is not gel forming. Next the conditioning chemicals are added to the glue base formed in the above manner. These chemicals comprise, for example, caustic soda or a mixture of caustic soda, hydrated lime, sodium silicate and, if desired, a thermo-setting resin. The glue then is ready for use. In general, any of the alkaline conditioning chemicals conventionally used in the protein adhesive art to develop adhesive properties may be added to the glue base of my invention to develop adhesive properties therein.

Thus it will be seen that the process disclosed herein differs essentially from that set forth in my aforesaid U.S. Patent No. 1,976,436 in that, in the process of the patent coagulation of the blood base material specifically is avoided, whereas in the instant application, the blood base material is coagulated prior to the incorporation of the conditioning materials. Furthermore, it differs fundamentally from the process set forth in my aforesaid U.S. Patent 2,400,541 in that the process of the latter employs dried, insoluble blood as the base material, and uses a caustic alkali treatment at elevated temperature as a means of dispersing the blood and dissolving it in an aqueous medium. In the present process, on the other hand, the base material is aqueous-dissolved soluble dried blood, or fresh blood or a mixture of soluble dried blood and fresh blood, which is coagulated preferably by the application of heat, thereby forming an aqueous dispersion of finely divided, undried coagulated blood. The temperature of the dispersed mixture then is reduced to below about 120° F., preferably to about 70° to 95° F., and the caustic alkali or other alkaline conditioning chemicals added to the cool, or cold, mixture, as a conditioning agent for improving the adhesive properties of the glue, rather than as a dispersing agent.

Considering the procedure of this invention in greater detail:

In coagulating the blood, water soluble dried blood for example, first is mixed with sufficient water, about 1 to 3 parts by weight of water to 1 part by weight of soluble dried blood, to form a thin slurry. If the starting material is fresh blood the water content thereof must be taken into consideration since the final glue should have an amount of water varying from 3 to 10 parts by weight per part by weight of blood solids calculated as soluble dried blood. The mixing preferably is carried out at approximately room temperature and is continued until the slurry is free from lumps and of uniform consistency. Next the resulting blood solution, or its equivalent in liquid, undried blood, is heated to a blood-coagulating temperature lying within the broad range of between about 120° F. and the boiling point of the mixture, preferably between about 130° F. and about 160° F., for a period of time varying from about 1 to 20 minutes, preferably about 1 to 10 minutes. In general, the higher the temperature employed to effect coagulation the shorter the time required and the lower the temperature employed the longer the time required. As is brought out more fully in the examples, the temperature used in the coagulation has a direct effect upon the viscosity characteristics of the glue. In general, however, where the coagulating temperature is at least 120° F., but somewhat below the boiling point of the mixture, the desired viscosity characteristics are imparted to the final glue.

The coagulating operation preferably is carried out with contemporaneous beating, stirring, or other form of agitation. This results in the dispersion of finely divided particles of coagulated undried blood throughout the aqueous medium and avoids the formation of undesirable lumps and curds. It also improves the handling properties of the resulting glue and enhances its adhesive characteristics.

The manner of applying heat to the blood solution is variable as required, for example, to adapt the process to various types of equipment. Thus it may be carried out in a reaction vessel equipped with external heating means such as a steam jacket which may be used to elevate the temperature of the contents of the vessel to the desired temperature level. Alternatively, it may be carried out in a vessel equipped with means for injecting steam directly into the blood solution, this having the secondary effect of diluting the solution with the condensed steam. However, to produce an exceptionally well dispersed coagulum, it is preferred to accomplish the necessary heating by adding to the aqueous solution of soluble dried blood (or to dilute whole blood or to an aqueous solution of soluble dried blood and fresh blood) a quantity of hot water which serves the dual function of elevating the temperature of the solution and also of diluting it to a point where it is useful as a commercial glue product. This may be done, for example, by adding water at a blood coagulating temperature, for example, at about 175° to 210° F., preferably at about 200° F., to the blood solution at a controlled rate with constant stirring. This treatment results in the formation of a coagulated blood dispersion of particularly good consistence and viscosity.

After the blood has been coagulated by the application of heat, the resulting coagulum is cooled to a temperature of below about 120° F., preferably to about room temperature. Since the mixture has a watery consistency, no chemical having been added during the coagulation to cause it to gel, the cooling may be accomplished rapidly in a matter of minutes by passing cold water through a jacket surrounding the coagulating vessel. The cooled mixture has adhesive properties per se and may be used as a glue in hot press operations. It is preferred, however, to improve its adhesive properties, i.e., to condition it, by the addition of various chemical agents such as the alkaline conditioning chemicals conventionally used in the protein adhesive art to develop adhesive properties. Caustic soda alone or a mixture of caustic soda, lime, and sodium silicate are the preferred conditioning chemicals.

As an alternative procedure, the blood may be coagulated by the addition of a chemical agent to the blood solution, rather than by the action of heat. This may be preferred in some instances because it eliminates the heating and cooling operations. In some instances it may be preferred to effect coagulation by acidulation in conjunction with mild heating, say heating at 80° to 120° F., for short periods of time, say from about ½ to 3 minutes. Suitable acid coagulating agents include the mineral and organic acids and salts having an acid reaction in aqueous solutions, the mineral and organic acids being preferred. Illustrative of mineral acid coagulating agents are sulfuric acid, hydrochloric acid, phosphoric acid and the like. Suitable organic acids comprise formic acid, acetic acid, propionic acid, etc. Representative acid salts include sodium acid sulfate, aluminum sulfate, potassium acid sulfate, aluminum chloride, magnesium chloride and the like. These may be dissolved in water and the resulting acid solution added to an aqueous solution of the soluble blood, or directly to the fresh blood, in amounts sufficient to coagulate the same. Again, the total amount of water used to make the glue base of my invention varies from about 3 to 10 parts by weight of water to 1 part by weight of blood calculated as soluble dried blood. In general, in accordance with known art, the quantity of acid agent used should be sufficient to effect coagulation of the blood. The coagulating operation preferably is accompanied by thorough stirring or other form of agitation to avoid the formation of lumps, and may or may not be accompanied by contemporaneous application of heat, as noted above, to increase the coagulation rate. The resulting coagulum is, in general, similar to that produced by the action of heat alone and may be used as an adhesive per se in the hot press, but preferably may be used as a glue base in the formulation of various glue mixtures.

When the coagulum is to be used as a glue base, whether produced by the action of heat or of chemical coagulants or other blood coagulating means, it is conditioned by the addition of suitable proportions of alkaline conditioning agents such as, for example, caustic alkali (e.g. sodium hydroxide or potassium hydroxide), per se, or caustic alkali, lime, and sodium silicate. In addition, there may be included in the mixes anti-foaming agents such as pine oil and fillers such as wood flour or walnut shell flour.

Although the proportions of these materials are variable depending upon the application contemplated, a preferred range and a specific formulation are given in Table I wherein the proportions are expressed in parts by weight.

TABLE I

|  | Preferred range | Specific formulation |
| --- | --- | --- |
| Blood | 100 | 100 |
| Water | 300–1,000 | 700 |
| Caustic alkali | 1–50 | 10 |
| Lime | 1–50 | 10 |
| Sodium silicate | 10–400 | 50 |

The caustic alkali either when used per se or in admixtures with the alkaline conditioning chemicals listed in Table I should be limited so that the total caustic alkali content is not substantially in excess of 50 parts by weight per 100 parts by weight of blood calculated as soluble dried blood. A range of 5% to 15% by weight of caustic based on the blood is preferred.

Where pine oil is used as an anti-foaming agent and wood flour is used as a filler, these materials may be included in the above formulation in amounts of between about 1 and 10 parts of pine oil to 5 to 100 parts of wood flour.

The order of addition and mixing of the various reagents indicated above also is somewhat variable. In general, however, it is preferred to add part of the water cold to the soluble blood in order to dissolve it. Then an additional proportion of the water may be added hot in order to attain the desired coagulating temperature. Then a further quantity of water may be employed to dissolve the caustic alkali or other alkaline conditioning chemical and the resulting solution added to the cooled glue base with stirring. Next the lime, if used, may be mixed with sufficient water to suspend it and added with continuous stirring. Finally the sodium silicate, if used, may be added in the form of the commercial water solution and thoroughly incorporated in the mix. The anti-foaming agent and the filler may be added at any suitable point in the procedure. The total water content of the glue is controlled as pointed out above.

As has been indicated above, there also may be incorporated in the glue compositions of the present invention a thermosetting resin which makes the glue particularly useful in hot press operations, forming a strong bond, improving its water resistance, and preventing the decomposition of the glue by bacteria, molds and fungi during the life of the glue product. The glues of the following illustrative examples are particularly well suited for such use since the addition of the thermosetting resin does not cause the glue mix to thicken and gel so as to be inapplicable on conventional glue spreaders. This heretofore has been a primary problem widely encountered in the use of blood and other (e.g. soy bean) glues containing thermosetting resins. Furthermore, the use of the resin has the beneficial effect of substantially improving the assembly time and spreadability of the glues.

Still further, the thermal requirements of the glue, i.e. the amount of heat required to set it in a hot press operation, are not materially increased by the addition of the thermosetting resin. This result is unexpected, inasmuch as it would appear that the heat requirements of the resin would increase substantially the amount of heat required to set the blood-resin mixture. It has an important effect upon the economy of the pressing operation, since it enables the use of short press times and low temperatures in the press, thereby resulting in substantial economies in the operation of the plywood mill.

The thermosetting resins which may be used together with the blood glues of the present invention comprise broadly the phenol-aldehyde resins as a class. Illustrative of such resins are the resinous condensation products of phenol and formaldehyde, the cresols and formaldehyde, resorcinal and formaldehyde, phenol and furfural and the like. These may be used in their usual commercial form, i.e., in the form of their aqueous solutions having a solids content of about 40% by weight.

The amount of thermosetting resin incorporated in the presently described glue mixture may vary, for example, from about 10 parts to about 1000 parts by weight (solids basis) of thermosetting resin per 100 parts of blood, the other constituents of the mix being employed in substantially the proportions set out above. The thermosetting resin may be incorporated at various stages of the mixing procedure, although it is preferred to add it after the caustic alkali has been added to the aqueous coagulated blood glue base.

Thus in this preferred procedure, the blood may be coagulated by the action of heat or of chemicals as indicated above. The coagulum then is cooled, if necessary, after which caustic soda or other alkaline conditioning chemical, or caustic soda, lime, sodium silicate, filler and an anti-foaming agent are added, these materials being intimately mixed together to form a thick, creamy mixture. The phenolic resin then is added as an aqueous solution, and the mixing continued until the resin has been intimately dispersed throughout the glue mixture. The glue then is ready for application to the wood veneers or other objects to be glued together.

The glue mixtures prepared as described above may be applied in the plywood fabricating operation using the conventional glue spreaders and other equipment. Their application in such equipment is particularly easy because of their spreadability, stable viscosity, and non-gelling characteristics. Also, their consistency is such as to prevent excessive penetration into the wood veneers during the assembling operation, which increases the assembly time correspondingly. After applying the glue, the veneers may be assembled in the usual manner and pressed, either in the cold press or in the hot press, depending upon the particular composition employed and the plywood application contemplated.

The novel glues of the present invention and the process for their preparation are illustrated in the following examples wherein parts are expressed as parts by weight.

EXAMPLE 1

This example illustrates a preferred formulation for preparing the glues of the present invention.

100 parts soluble dried blood, 150 parts water at 50° F., 25 parts wood flour filler and 3 parts pine oil anti-foaming agents were mixed in a conventional mixer equipped with a cooling jacket until the resulting mixture was of uniform consistency and free from lumps. 525 parts of water at a temperature of 200° F., then was added with stirring. This raised the temperature of the mixture to a maximum of 145° F. The mixing was continued for a period of 2 minutes, after which the mixture was cooled to 80° F. An additional 3 parts pine oil was added followed by a mixing period of 1 minute. Next 9 parts sodium hydroxide dissolved in 30 parts water was added and the mixture stirred for an additional 5 minutes. Then 8 parts hydrated lime dispersed in 16 parts water was added. After stirring for 3 minutes, 40 parts sodium silicate was added and the mixture stirred for another 3-minute period. This formed the final glue.

EXAMPLE 2

This example follows Example 1 except that caustic soda is the sole adhesive conditioning agent added to the aqueous coagulated blood glue base. The procedure was as follows:

100 parts soluble dried blood, 150 parts water at 50° F., 25 parts wood flour filler and 3 parts pine oil anti-foaming agent were mixed in a conventional mixer equipped with a cooling jacket until the resulting mixture was of uniform consistency and free from lumps. 525 parts of water at a temperature of 200° F., then was added with stirring. This raised the temperature of the mixture to a maximum of 145° F.

The mixing was continued for a period of 2 minutes, after which the mixture was cooled to 80° F. An additional 3 parts pine oil was added followed by a mixing period of 1 minute. Next 9 parts sodium hydroxide dissolved in 30 parts water were added and the mixture stirred for an additional 5 minutes.

This glue preparation has desirable adhesive properties and is satisfactory for interior grade plywoods.

EXAMPLE 3

This example illustrates the preparation of the glues of the present invention by an alternate procedure in which the coagulation of the blood is effected by direct injection of steam into a blood solution.

100 pounds soluble dried blood, 100 pounds water and 5 pounds pine oil were mixed 10 minutes in a jacket mixer provided with a stirrer and a steam line running directly into the mixer. An additional 150 pounds water then was added and the mixing continued for 5 minutes.

Steam was then introduced into the blood solution until the temperature of the mix was raised to 160° F. This required about 6 minutes. Stirring was continued during the coagulating operation. Cold water then was introduced into the mixing jacket and the stirring continued for 10 minutes more. Then an additional 500 pounds of cold water was added. This reduced the temperature of the mixture to substantially room temperature.

To the glue base prepared as described above, 12 pounds of caustic soda dissolved in 12 pounds water was added after which the mixture was stirred for 10 minutes. 12 pounds lime dispersed in 24 pounds water then was added with stirring for a 3-minute period, after which 40 pounds of commercial sodium silicate was introduced followed by another 3-minute period of mixing.

The resulting glue was pumped into a cold press spreader and spread in conventional manner on wood veneers which then were assembled to form 13/16 5-ply, 7/16 3-ply and 5/16 3-ply panels. The panels were pressed for a period of 15 minutes in the cold press in a single press load using the conventional no clamp procedure. An excellent bond was formed in all cases.

EXAMPLE 4

In this example, following the procedure of Example 3 but omitting the use of lime and sodium silicate then employed, the procedure was as follows:

100 parts soluble dried blood, 100 parts water, and 5 parts pine oil were mixed 10 minutes in a jacketed mixer provided with a stirrer and a steam line running directly into the mixer. An additional 150 parts water then were added and the mixing continued for 5 minutes. Steam was introduced into the blood solution with stirring until the temperature of the mix was raised to 160° F. This required about 6 minutes. Cold water then was introduced into the mixing jacket and the stirring continued for 10 minutes more. Then an additional 500 parts of cold water were added. This reduced the temperature of the mixture to substantially room temperature.

To the glue base prepared as described above, 12 parts of caustic soda dissolved in 12 parts water were added, after which the mixture was stirred for 10 minutes.

Glue thus prepared has bonding characteristics desirable in the production of interior grade plywoods.

EXAMPLE 5

This example illustrates the application of an organic acid, formic acid, as a coagulating agent.

100 parts soluble dried blood was mixed with 5 parts pine oil and 250 parts water at room temperature until a uniform solution of the blood was obtained. 7 parts formic acid dissolved in 250 parts water then was added gradually with stirring. Then were added in succession, 18 parts caustic soda dissolved in 18 parts water, 12 parts hydrated lime dispersed in 24 parts water, 50 parts sodium silicate, 20 parts wood flour, and 20 parts water, the mixture being stirred after each addition and finally stirred until the constituents were thoroughly blended.

The resulting mixture had a viscosity of 250 poises, measured on a Brookfield viscosimeter at a temperature of 25° C. It was of creamy consistency and when applied to the manufacture of plywood, using a spread of about 135 pounds per thousand square feet of double glue line (three-ply) and the conventional cold press, no clamp operation, gave a strong bond at assembly times varying between 5 minutes and 35 minutes.

EXAMPLE 6

This example illustrates the application of a mineral acid, sulfuric acid, as a coagulating agent.

Another glue composition was made following the procedure of Example 5, with the exception that 5.3 parts 98% sulfuric acid dissolved in 250 parts water was used as a coagulating agent rather than the formic acid solution of that example. In addition, 200 parts more water were added just prior to the final mixing. The resulting glue had a viscosity of 570 poises (Brookfield at 25° C.) and shared the desirable qualities of spreadability and stability heretofore noted as being characteristics of the presently described glue mixes. When applied to the manufacture of plywood using the conditions outlined in Example 5, strong bonding of the veneers again was obtained.

EXAMPLE 7

This example illustrates the use of a thermosetting resin in the blood glue compositions of the present invention.

A glue mixture was prepared by the procedure of Example 3. To one-half of the mixture was added 25 pounds of phenol-formaldehyde liquid resin in the form of a commercial water solution of the resin having a solids content of about 40% by weight. After mixing for 3 minutes, the resulting mixture was applied to Douglas fir veneers which then were laid up in the conventional manner to form 13/16 inch, five-ply panels, using about 75 pounds of glue per thousand square feet of double glue line. Excellent bonding was obtained after pressing at 270° F., plate temperature for 4 and 1/4 minutes, and also at 285° F., press temperature for 5 minutes total time in the press.

EXAMPLE 8

This example illustrates an alternate procedure for preparing the blood glue compositions of the present invention in which a thermosetting resin is incorporated.

A dry mixture comprising 100 parts soluble dried blood, 25 parts wood flour, and 3 parts pine oil was prepared. 128 parts of this mixture then was mixed for 2 minutes with 150 parts water at 70° F. Next 675 parts of water at 180° F., was added, followed by thorough mixing. The glue base then was cooled to 70° F.

Next a solution of 12 parts caustic soda in 30 parts water was added to the glue base followed by a mixing period of 10 minutes. 150 parts of a commercial liquid phenol-formaldehyde resin having a solids content of about 40% by weight was added, after which the mixture was stirred for another 3-minute period. Finally, 8 parts hydrated lime in 16 parts water, and 120 parts sodium silicate were added succesively, each addition being followed by mixing for 3 minutes. The glue was then ready for use.

EXAMPLE 9

This example illustrates the effect of coagulating the blood on the time-viscosity behavior of the resulting glue, and the superiority of the presently described glues with respect to this property over those disclosed in my aforesaid U.S. Patent 1,976,436.

150 parts water at 70° F., was mixed with 128 parts of a dry mixture comprising 100 parts soluble dried blood, 25 parts wood flour and 3 parts pine oil and the resulting mixture stirred for 2 minutes. 525 parts water at 180° F., then was added with stirring, the mixture thereafter being cooled to 70° F.

Next 9 parts caustic soda in 30 parts water was added followed by a mixing period of 10 minutes. Finally, 8 parts hydrated lime in 16 parts water and 40 parts sodium silicate were added in succession, each addition being followed by a mixing period of 3 minutes. The resulting glue is designated herein glue A.

Next another glue, glue B, was prepared following the above procedure exactly except that the second addition of water had a temperature of 70° F., rather than 180° F., and, as a result, no coagulation of the blood occurred.

The viscosities of glues A and B were determined at specified intervals of time using a Brookfield viscosimeter at 25° C. The results are given in Table II.

TABLE II

| Glue | Viscosity (poises) after— | | | | |
|---|---|---|---|---|---|
| | ¼ hour | 1 hour | 2 hours | 4 hours | 6 hours |
| A | 185 | 320 | 458 | 545 | 550 |
| B | 41 | 574 | 1,875 | 2,350 | 2,360 |

It is apparent from the data of Table II that coagulation of the blood before the addition of the conditioning chemicals spells out the difference between providing a glue having a relatively narrow and useable viscosity range over periods of up to six hours, or providing a glue the viscosity of which increases rapidly to a value at which it no longer is suitable for use.

EXAMPLE 10

This example illustrates the effect of the coagulating temperature on the viscosity behavior of the glue of this invention.

A series of plywood glues was formulated using the procedure of Example 1, with the exception that the temperature of the water added to coagulate the blood was varied over a range of 60° F., to 200° F., thus increasing correspondingly the temperature of coagulation. The viscosities (Brookfield at 25° C.) of the glues then were determined at intervals over a total period of 5½ hours. The results are given in Table III.

TABLE III

Variations of viscosity (poises) of glue mixtures with time

| Glue | Temp. of added water, degrees | Max. temp. of glue before cooling, degrees | Time (hours) | | | | | | |
|---|---|---|---|---|---|---|---|---|---|
| | | | ¼ | ¾ | 1½ | 2½ | 3½ | 4½ | 5½ |
| C | 135 | 117 | 175 | 370 | 770 | 940 | 970 | 860 | |
| D | 150 | 124 | 225 | 550 | 650 | 850 | 845 | 765 | 700 |
| E | 175 | 139 | 260 | 350 | 390 | 465 | 505 | 493 | |
| F | 200 | 156 | 650 | 570 | 550 | 510 | 500 | 460 | 435 |

The data of Table III indicate clearly that, over a wide range of coagulating temperatures, the viscosities of the resulting glues remained within a working range for substantial periods of time. In addition, the spreadability of these glues remained exceptionally good, there being no tendency for them to become rubbery in consistency.

EXAMPLE 11

This example illustrates the effect of using uncoagulated blood in the preparation of plywood glues by a method analogous to that employed in the formulation of the glues of the present invention, with particular reference to the effect of stirring on the viscosity behavior of the glue.

In this example, glues A and B were prepared by the method of Example 9.

Glues G, H and I were also prepared by the method of Example 9, except that the temperature of the added coagulating water was varied as indicated in Table IV, infra.

Glue J was prepared by the process of Example 8.

Glue K was prepared by the process of Example 8, except that the added water was at a temperature of 70° F., and hence no coagulation of the blood occurred. Thus in this example there are presented a series of glues, of which glues, A, G, H, I and J were prepared by the process of the present invention, while glues B and K were prepared by an analogous process but without coagulation of the blood. Of these, glues A, G, H, I and B contained no phenolic resin as an added material, while glues J and K did contain added phenolic resin.

The viscosities (Brookfield at 25° C.) of the foregoing glues were determined at specified time intervals during which they were subjected to vigorous agitation. The results are given in Table IV.

TABLE IV

Viscosities of stirred samples (poises)

| Glue | Temp. of added water, °F. | Max. temp. of mix before cooling (°F.) | 5 min. | 10 min. | 15 min. | 20 min. |
|---|---|---|---|---|---|---|
| A | 180 | 139 | 242 | 250 | 300 | 360 |
| G | 180 | 140 | 250 | 300 | 250 | 410 |
| H | 160 | 128 | 278 | 490 | 800 | |
| I | 150 | 122 | 255 | 540 | 850 | |
| B | 70 | 70 | 200 | 800 | 2,250 | 2,400 |
| J | 180 | 147 | 122 | 127 | 134 | 154 |
| K | 70 | 70 | 200 | 535 | 965 | 2,500 |

From the data presented in Table IV, it is apparent that glues containing uncoagulated blood (glues B and K) rapidly increase in viscosity to an extent at which they no longer are useable, regardless of whether or not they contain added phenolic resins. Thus the viscosity of glue B increased to value of 2250 poises after a stirring period of only 15 minutes, and the viscosity of glue K, which contained added phenolic resin, increased to a value of over 2500 poises after a stirring period of 20 minutes, these values being in excess of satisfactory working viscosities. This fact undoubtedly is responsible for the unsatisfactory behavior of such glues in conventional plywood glue spreaders, since a substantial agitation occurs therein which is sufficient to produce the marked viscosity increase described above.

The glues prepared by the process of the present invention on the other hand, retained satisfactory working viscosities over substantially the entire test period. Glues A, G, and J, for example, attained maximum viscosity after 20 minutes of stirring of only 360, 410 and 154 poises, respectively. Even glues H and I prepared by a process in which the maximum coagulating temperatures were only 128° and 122° F., respectively, after 15 minutes of stirring had viscosities of 800 and 850 poises, respectively, whereas glue B, which was analogous but incorporated, uncoagulated blood, had a viscosity of 2250 poises. This advantageous property of maintaining desired viscosity values while being subjected to mechanical action obviously is of the greatest significance in determining the remarkable superiority of the presently described glues in the manufacture of plywood.

EXAMPLE 12

This example illustrates the high degree of adhesiveness imparted to the presently described glues solely by the operation of coagulating soluble blood while maintaining the coagulated particles in finely divided condition.

A series of glues was prepared which contained no conditioning chemicals whatsoever prepared at various blood coagulating temperatures. As controls, glues were prepared under identical conditions except that the blood contained therein was not coagulated.

Thus the glues of this example were formulated by dissolving 100 parts dried soluble blood in 100 parts water at 70° F., 3 parts pine oil being included in the mixture to abate foaming. An additional quantity of water at the specified temperature then was added together with a further quantity of pine oil. The resulting mixture then was stirred further and cooled to 70° F. These conditions are summarized in Table V.

TABLE V

| Glue | Water at 70° F. (parts) | Soluble dried blood (parts) | Pine oil (parts) | Added temp. (° F.) | Water amt. (parts) | Pine oil (parts) | Max. temp. of glue before cooling mix (° F.) |
|---|---|---|---|---|---|---|---|
| L | 100 | 100 | 3 | 200 | 400 | 3 | 145 |
| M | 100 | 100 | 3 | 150 | 400 | 3 | 121 |
| N | 100 | 100 | 3 | 70 | 400 | 3 | 72 |
| O | 100 | 100 | 3 | 200 | 200 | 3 | 130 |
| P | 100 | 100 | 3 | 70 | 200 | 3 | 70 |

The glues then were applied to the fabrication of plywood. Douglas fir veneers were coated with the glue, laid up into 5-ply, 9/16 inch panels, and pressed for 5½ minutes at 175 p.s.i. and 240° F. press temperature with one panel per press opening. The resulting plywood panels then were tested by means of the conventional shear test, both dry and after soaking in water for two days. In all cases, the strength of the panels prepared with the glues of the present invention (glues L, M and O) were markedly higher than those of the panels prepared using the control glues (glues N and P). At an assembly time of 10 minutes, for example, control panels made using control glues N and P delaminated completely, whereas substantial bonding was obtained in the case of panels incorporating the glues of the invention, i.e., glues L, M, and O. The tests further indicated the distinct utility of glues such as glues L, M and O containing no alkaline conditioning agent in applications such as in gluing very thin, porous, face veneers where alkaline stain is to be avoided.

EXAMPLE 13

This example illustrates the inapplicability of dried, coagulated blood (which is the raw material used in my aforesaid U.S. Patent 2,400,541) as a raw material for the preparation of the presently described glues.

The procedure of Example 1 was followed, except that fertilizer grade dried coagulated blood was employed rather than the soluble blood of that example. The blood could not be made to disperse throughout the mixture as required to produce an easily spreadable, homogeneous, cohesive and viscous mass, and the product was entirely unsuited for use as a plywood glue.

EXAMPLE 14

This example illustrates a procedure for preparing the blood glue compositions of the present invention in which a substantial quantity of thermosetting resin is incorporated.

A dry mixture comprising 100 parts dried soluble blood, 25 parts wood flour, and 3 parts pine oil was prepared. 128 parts of this mixture then was mixed for two minutes with 150 parts water at 70° F. Next 525 parts of hot water at 200° F. was added followed by thorough mixing. The resulting glue base then was cooled to 70° F.

Next a solution of 12 parts caustic soda in 30 parts water was added to the glue base followed by a mixing period of 10 minutes. 750 parts of a commercial liquid phenol-formaldehyde resin having a solids content of about 40% by weight was added, after which the mixture was stirred for another three-minute period. Finally, 8 parts hydrated lime in 16 parts water and 40 parts commercial silicate of soda were added successively, each addition being followed by mixing for three minutes.

Thus, by the present invention, I have provided a plywood blood glue base and glue which are characterized by numerous advantageous features. The blood glue base provides a new way to make a glue from coagulated blood, i.e. by the mere addition to the cold glue base of alkaline conditioning chemicals. The glue is, in the first place, of stable viscosity and excellent spreadability. As a result it can be used in relatively low spreads and at long assembly times. Furthermore, it retains its viscosity and spreading characteristics over a period of many hours. It therefore has a long pot life and can be used without making frequent adjustment of the spreader. Since it can be prepared without a cooking operation in which the blood is digested with chemical reagents, it can be prepared rapidly and economically without the cooling difficulty met when it is attempted to cool a chemically digested blood mixture which increases in viscosity and gels as the temperature decreases. Still further, it is admirably suited for use as a hot press glue, particularly in combination with the phenol aldehyde thermosetting resins. In connection with the latter use, the presently described blood glue is unique in that it does not gel, thicken and become unspreadable upon the addition of the phenolic resin and when used in conjunction with the same produces a glue having heat requirements not substantially greater than those required to set the blood glue alone.

The term "acid-coagulated blood particles" as used in the claims covers blood coagulated by acids and acidic materials typified by the examples herein set forth.

Having now described my invention in preferred embodiments, I claim:

1. The process of making a glue which comprises providing an aqueous blood material selected from the group consisting of fresh blood, an aqueous solution of soluble dried blood and mixtures thereof, heat coagulating the blood in dispersed form by increasing its temperature to between about 120° F. and the boiling point of the aqueous blood material, while agitating it for maintaining the coagulated blood particles in finely divided condition and dispersed throughout the aqueous medium, cooling the resulting aqueous dispersion of coagulated blood to a temperature of below about 120° F., and improving the adhesive qualities of the cooled aqueous coagulated blood dispersion and rendering it alkaline by admixing therewith an adhesive conditioner comprising an alkali metal caustic and a thermosetting phenol-aldehyde resin.

2. The process of making a glue which comprises providing an aqueous solution of soluble dried blood, heat coagulating the blood in dispersed form by increasing its temperature to between about 120° F. and the boiling point of the aqueous solution while agitating it for maintaining the coagulated blood particles in finely divided condition and dispersed throughout the aqueous medium, cooling the resulting aqueous dispersion of coagulated blood to a temperature of below about 120° F., and improving the adhesive qualities of the cooled aqueous coagulated blood dispersion and rendering it alkaline by admixing therewith an adhesive conditioner comprising sodium hydroxide and a thermosetting phenol-formaldehyde resin.

3. The process of making a glue which comprises providing an aqueous blood material selected from the group consisting of fresh blood, an aqueous solution of soluble dried blood and mixtures thereof, heat coagulating the blood in dispersed form by increasing its temperature to between about 120° F. and the boiling point of the aqueous blood material, while agitating it for maintaining the coagulated blood particles in finely divided condition and dispersed throughout the aqueous blood medium, cooling the resulting aqueous dispersion of coagulated blood to a temperature of below about 120° F., and improving the adhesive qualities of the cooled coagulated blood dispersion and rendering it alkaline by admixing an adhesive conditioner comprising an alkali metal caustic, lime, sodium silicate and a thermosetting phenol-aldehyde resin therewith.

4. The process of making a glue which comprises providing an aqueous blood material comprising at least one member of the group consisting of fresh blood and an aqueous solution of soluble blood, heat coagulating the blood by increasing its temperature to between about 130° F. and about 160° F. while agitating it for maintaining the coagulated blood particles in finely divided condition and dispersed throughout the aqueous blood medium, cooling the coagulated blood dispersion to a temperature of below about 120° F., and forming a a mixture of the cooled dispersion with a thermosetting phenol-formaldehyde resin, caustic soda, lime and sodium silicate in the relative proportions of from about 300 to about 1000 parts water in toto, from about 1 to about 50 parts caustic soda, from about 1 to about 50 parts lime, from about 10 to about 400 parts sodium silicate, and from about 10 to about 1000 parts phenol-formaldehyde resin for each 100 parts blood solids, parts being expressed as parts by weight.

5. The process of making a glue which comprises providing an aqueous blood material selected from the group consisting of fresh blood, an aqueous solution of soluble dried blood and mixtures thereof, the blood solids and water in said material varying from about 1:3 and 1:10, respectively, on a weight basis, coagulating the blood in said material while agitating it for maintaining the coagulated blood particles in finely divided condition and dispersed throughout the aqueous medium, and improving the adhesive qualities of the coagulated blood dispersion and rendering it alkaline by admixing therewith while the same is at a temperature below about 120° F. an adhesive conditioner comprising an alkali metal caustic and a thermosetting phenol-aldehyde resin.

6. The glue product of the process of claim 5.

7. The process of making a glue which comprises providing an aqueous blood material selected from the group consisting of fresh blood, an aqueous solution of soluble dried blood and mixtures thereof, the blood solids and water in said materials varying from about 1:3 and 1:10, respectively, on a weight basis, coagulating the blood in dispersed form by intimately admixing with the said solution an acid blood-coagulating agent while agitating it for maintaining the coagulated blood particles in finely divided condition and dispersed throughout the aqueous blood medium, and improving the adhesive qualities of the coagulated blood dispersion and rendering it alkaline by admixing therewith while the same is at a temperature below about 120° F. an adhesive conditioner comprising an alkali metal caustic and a thermosetting phenol-aldehyde resin.

8. The process of making a glue which comprises providing an aqueous blood material selected from the group consisting of fresh blood, an aqueous solution of soluble dried blood and mixtures thereof, the blood solids and water in said material varying from about 1:3 to 1:10 respectively, on a weight basis, coagulating the blood in dispersed form by intimately admixing with the said solution an acid blood-coagulating agent while agitating it for maintaining the coagulated blood particles in finely divided condition and dispersed throughout the aqueous blood medium, and improving the adhesive qualities of the coagulated blood dispersion and rendering it alkaline by admixing therewith while the same is at a temperature below about 120° F. an adhesive conditioner comprising caustic soda, lime, sodium silicate and a thermosetting phenol-formaldehyde resin.

9. The process of making glue which comprises providing an aqueous blood material selected from the group consisting of fresh blood, an aqueous solution of soluble dried blood and mixtures thereof, the blood solids and water in said material varying from about 1:3 to 1:10, respectively, on a weight basis, coagulating the blood in said material while agitating it for maintaining the coagulated blood particles in finely divided condition and dispersed throughout the aqueous medium, and improving the adhesive qualities of the coagulated blood dispersion and rendering it alkaline by admixing therewith while the same is at a temperature below about 120° F. an adhesive conditioner comprising an alkali metal caustic.

10. The glue product of the process of claim 21.

11. The process of making glue which comprises providing an aqueous blood material selected from the group consisting of fresh blood, an aqueous solution of soluble dried blood and mixtures thereof, the blood solids and water in said material varying from about 1:3 to 1:10, respectively, on a weight basis, coagulating the blood in said material while agitating it for maintaining the coagulated blood particles in finely divided condition and dispersed throughout the aqueous medium, and improving the adhesive qualities of the coagulated blood dispersion and rendering it alkaline by admixing therewith while the same is at a temperature below about 120° F. an adhesive conditioner comprising an alkali metal caustic, lime and sodium silicate.

12. The process of making a glue which comprises providing an aqueous blood material selected from the group consisting of fresh blood and an aqueous solution of soluble dried blood and mixtures thereof, heat coagulating the blood in said material by increasing its temperature to between about 120° F. and the boiling point of the aqueous blood material, while agitating it for maintaining the coagulated blood particles in finely divided condition and dispersed throughout the aqueous medium, cooling the resulting aqueous dispersion of coagulated blood to a temperature of below about 120° F., and improving the adhesive qualities of the cooled coagulated blood dispersion and rendering it alkaline by admixing therewith while the same is at a temperature below about 120° F. an adhesive conditioner comprising an alkali metal caustic.

13. The process of making a glue which comprises providing an aqueous solution of soluble dried blood, heat coagulating the blood in said solution by increasing its temperature to between about 120° F. and the boiling point of the aqueous solution, while agitating it for maintaining the coagulated blood particles in finely divided condition and dispersed throughout the aqueous medium, cooling the resulting aqueous dispersion of coagulated blood to a temperature of below about 120° F., and improving the adhesive qualities of the cooled coagulated blood dispersion and rendering it alkaline by admixing therewith while the same is at a temperature below about 120° F. an adhesive conditioner comprising an alkali metal caustic.

14. The process of making a glue which comprises providing an aqueous blood material selected from the group consisting of fresh blood, an aqueous solution of soluble dried blood and mixtures thereof, heat coagulating the blood in said material by increasing its temperature to between about 120° F. and the boiling point of the aqueous blood material, while agitating it for maintaining the coagulated blood particles in finely divided condition and dispersed throughout the aqueous blood medium, cooling the resulting aqueous dispersion of coagulated blood to a temperature of below about 120° F., and improving the adhesive qualities of the cooled coagulated blood dispersion and rendering it alkaline by admixing therewith while the same is at a temperature below about 120° F. an adhesive conditioner comprising an alkali metal caustic, lime and sodium silicate.

15. The process of making a glue which comprises providing an aqueous solution of soluble dried blood and heat coagulating the blood in said solution by increasing its temperature to between about 120° F. and the boiling point of the solution, while agitating it for maintaining the coagulated blood particles in finely divided condition and dispersed throughout the aqueous medium, cooling the resulting aqueous dispersion of coagulated blood to a temperature of below about 120° F., and improving the adhesive qualities of the cooled coagulated blood dispersion and rendering it alkaline by admixing therewith while the same is at a temperature below about 120° F. an adhesive conditioner comprising an alkali metal caustic, lime and sodium silicate.

16. The process of making a glue which comprises providing an aqueous solution of soluble dried blood, heat coagulating the blood in dispersed form by adding hot water to increase its temperature to between about 120° F. and the boiling point of the aqueous solution, while agitating it to maintain the coagulated blood particles in finely divided condition and dispersed throughout the aqueous medium, cooling the resulting aqueous dispersion of coagulated blood to a temperature of below about 120° F., and improving the adhesive qualities of the coagulated blood dispersion and rendering it alkaline by admixing therewith while the same is at a temperature below about 120° F. an adhesive conditioner comprising caustic soda.

17. The process of making a glue which comprises providing an aqueous solution of soluble dried blood, heat coagulating the blood in dispersed form by adding hot water to increase its temperature to between about 120° F. and the boiling point of the aqueous solution, while agitating it to maintain the coagulated blood particles in finely divided condition and dispersed throughout the aqueous medium, cooling the resulting aqueous dispersion of coagulated blood to a temperature of below about 120° F., and improving the adhesive qualities of the coagulated blood dispersion and rendering it alkaline by admixing therewith while the same is at a temperature below about 120° F. an adhesive conditioner comprising caustic soda, lime and sodium silicate.

18. The process of making a glue which comprises providing an aqueous blood material selected from the group consisting of fresh blood, an aqueous solution of soluble dried blood and mixtures thereof, coagulating the blood in said material by intimately admixing with the said material an acid blood-coagulating agent while agitating it for maintaining the coagulated blood particles in finely divided condition and dispersed throughout the aqueous medium, and improving the adhesive qualities of the coagulated blood dispersion and rendering it alkaline by admixing therewith while the same is at a temperature below about 120° F. an adhesive conditioner comprising an alkali metal caustic, the water and blood being present after the admixing in the relative proportions of from about 1 part of blood solids to about 3 to 10 parts water, parts being expressed as parts by weight.

19. The process of making a glue which comprises providing an aqueous blood material selected from the group consisting of fresh blood, an aqueous solution of soluble dried blood and mixtures thereof, coagulating the blood in said material by intimately admixing with the said material an acid blood-coagulating agent while agitating it for maintaining the coagulated blood particles in finely divided condition and dispersed throughout the aqueous medium, and improving the adhesive qualities of the coagulated blood dispersion and rendering it alkaline by admixing therewith while the same is at a temperature below about 120° F. an adhesive conditioner comprising an alkali metal caustic, lime, and sodium silicate, the water and blood being present after the admixing in the relative proportions of from about 1 part of blood solids to about 3 to 10 parts water, parts being expressed as parts by weight.

20. The process of making a glue which comprises providing an aqueous blood material selected from the group consisting of fresh blood, an aqueous solution of soluble dried blood and mixtures thereof, the blood solids and water in said material varying from about 1:3 and 1:10, respectively, on a weight basis, converting said aqueous blood material into an aqueous suspension of coagulated blood particles selected from the group consisting of blood particles heat-coagulated at a temperature between about 120° F. and the boiling point of the aqueous blood material, and acid-coagulated blood particles, by coagulating the blood in said initially prepared aqueous blood material while agitating it for maintaining the coagulated blood particles in finely divided condition and dispersed throughout the aqueous medium; and improving the adhesive qualities of the coagulated blood dispersion and rendering it alkaline by admixing therewith while the same is at a temperature below about 120° F. an adhesive conditioner comprising an alkali metal caustic and a thermosetting phenol-aldehyde resin.

21. The process of making glue which comprises providing an aqueous blood material selected from the group consisting of fresh blood, an aqueous solution of soluble dried blood and mixtures thereof, the blood solids and water in said material varying from about 1:3 to 1:10, respectively, on a weight basis, converting said aqueous blood material into an aqueous suspension of coagulated blood particles selected from the group consisting of blood particles heat-coagulated at a temperature between about 120° F. and the boiling point of the aqueous blood material, and acid-coagulated blood particles, by coagulating the blood in said initially prepared aqueous blood material while agitating it for maintaining the coagulated blood particles in finely divided condition and dispersed throughout the aqueous medium; and improving the adhesive qualities of the coagulated blood dispersion and rendering it alkaline by admixing therewith while the same is at a temperature below about 120° F. an adhesive conditioner comprising an alkali metal caustic.

22. The process of making glue which comprises providing an aqueous blood material selected from the group consisting of fresh blood, an aqueous solution of soluble dried blood and mixtures thereof, the blood solids and water in said material varying from about 1:3 to 1:10, respectively, on a weight basis, converting said aqueous blood material into an aqueous suspension of coagulated blood particles selected from the group consisting of blood particles heat-coagulated at a temperature between about 120° F. and the boiling point of the aqueous blood material, and acid-coagulated blood particles, by coagulating the blood in said initially prepared aqueous blood material while agitating it for maintaining the coagulated blood particles in finely divided condition and dispersed throughout the aqueous medium; and improving the adhesive qualities of the coagulated blood dispersion and rendering it alkaline by admixing therewith while the same is at a temperature below about 120° F. and adhesive conditioner comprising an alkali metal caustic, lime and sodium silicate.

23. The glue product of the process of claim 22.

References Cited in the file of this patent

UNITED STATES PATENTS

| | | |
|---|---|---|
| 1,632,321 | Sternberg | June 14, 1927 |
| 1,925,232 | Cooper | Sept. 5, 1933 |
| 1,955,232 | Lienig | Apr. 17, 1934 |
| 1,976,436 | Cone | Oct. 9, 1934 |
| 2,155,417 | Griffith | Apr. 25, 1939 |
| 2,292,624 | Fawthrop | Aug. 11, 1942 |
| 2,372,658 | Buckley et al. | Apr. 3, 1945 |
| 2,375,195 | Carmichael | May 8, 1945 |
| 2,389,183 | Cone et al. | Nov. 20, 1945 |
| 2,400,541 | Cone et al. | May 21, 1946 |
| 2,466,710 | Keil et al. | Apr. 12, 1949 |

FOREIGN PATENTS

| | | |
|---|---|---|
| 189,417 | Germany | July 1, 1906 |

OTHER REFERENCES

Cassell's Dictionary of Cookery, received 1882, page 71.
Hawk et al.: Practical Physiological Chem., 1947, pages 422, 423, 559, 569, 579 and 580.